Figure 1:
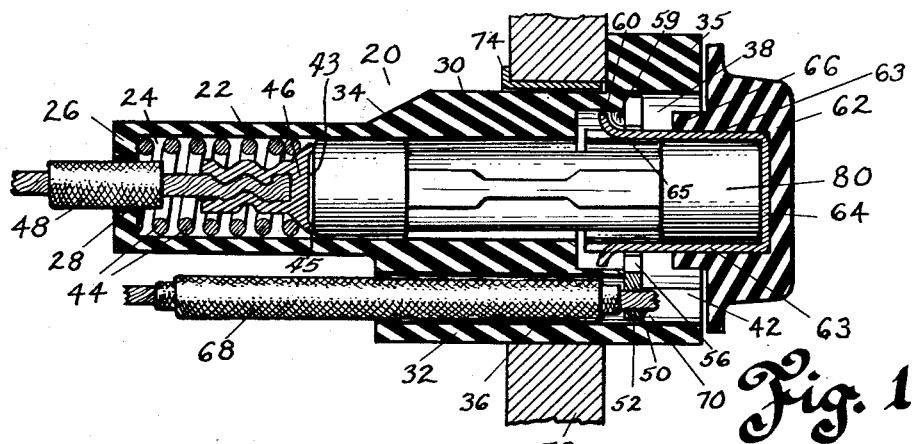

Feb. 2, 1954

M. F. DUERKOB 2,668,215

HOLDER FOR CARTRIDGE ENCLOSED PROTECTORS
FOR ELECTRIC CIRCUITS

Filed Aug. 7, 1948

2 Sheets-Sheet 1

INVENTOR
MANFRED F. DUERKOB
BY
Rey Eilers
ATTORNEY

Feb. 2, 1954    M. F. DUERKOB    2,668,215
HOLDER FOR CARTRIDGE ENCLOSED PROTECTORS
FOR ELECTRIC CIRCUITS
Filed Aug. 7, 1948    2 Sheets-Sheet 2

INVENTOR
Manfred F. Duerkob
BY
Ray Filers
ATTORNEY

Patented Feb. 2, 1954

2,668,215

UNITED STATES PATENT OFFICE 2,668,215

HOLDER FOR CARTRIDGE ENCLOSED PROTECTORS FOR ELECTRIC CIRCUITS

Manfred F. Duerkob, St. Louis, Mo., assignor to McGraw Electric Company, Elgin, Ill., a corporation of Delaware Application August 7, 1948, Serial No. 43,035

4 Claims. (Cl. 200—129)

This invention relates to improvements in holders for cartridge enclosed protectors for electric circuits. More particularly, this invention relates to improvements in devices that hold and support cartridge enclosed protectors for electric circuits.

It is therefore an object of the present invention to provide an improved device for holding and supporting cartridge enclosed protectors for electric circuits.

In the use of cartridge enclosed protectors for electric circuits it is oftentimes desirable to provide a number of clips or mounting blocks in which the protectors for electric circuits are mounted and secured. In such instances, a number of the blocks or clips are mounted adjacent each other, and the circuit protectors supported thereby. In other instances, it is desirable to provide individual devices for holding and supporting each of the cartridge enclosed protectors for electric circuits. Where the cartridge enclosed protectors for electric circuits are electric fuses of generally cylindrical form, the devices for holding and supporting the protectors for electric circuits frequently take the form of elongated hollow structures that can be supported in a panel or other support and that can have leads or wires connected to them. A number of holders of this general type have been proposed and built, but none of them has been truly satisfactory. The present invention provides a device, for holding and supporting cartridge enclosed protectors for electric circuits, which overcomes many of the deficiencies of prior art holders, and which is a marked improvement thereover.

Prior holders for cartridge enclosed electric fuses had projecting contacts or terminals to which leads or wires could be soldered or otherwise secured. Such projecting contacts or terminals, and the leads or wires secured thereto, were constantly exposed to accidental contact by other leads or wires or by sharp metal points; and any such accidental contact might bypass the fuse and lose the protection normally afforded by the fuse, might needlessly cause the fuse to open, or might interconnect two normally independent circuits with undesired results. The present invention obviates such accidental contact by providing a holder for cartridge enclosed electric fuses wherein all of the contacts or terminals are disposed wholly within the holder and wherein no "live" parts are exposed. With such an arrangement, the insulation on the leads or wires extends into the holder; and the leads being secured to the contacts within the holder, all external portions of the holder and leads or wires are covered with insulation. It is therefore an object of the present invention to provide a holder for cartridge enclosed electric fuses wherein all of the contacts are disposed wholly within the holder and wherein no "live" parts are exposed.

In certain prior holders for cartridge enclosed electric fuses, it was felt desirable to provide openings which extended from the exterior to the interior of the holders and thus extended to points adjacent the electric fuses disposed within those holders. Such openings are undesirable because they can permit accidental contact of a wire or a sharp point of metal with the cartridge enclosed electric fuse. The present invention obviates any such accidental contact by providing a holder for cartridge enclosed electric fuses wherein all openings or passages from the exterior to the interior of the holder are either closed or baffled when the holder is assembled. It is therefore an object of the present invention to provide a holder for cartridge enclosed electric fuses wherein all openings from the exterior to the interior of the holder are closed or baffled when the holder is assembled.

The holder for cartridge enclosed fuses provided by the present invention has contacts to engage the terminals of the electric fuse disposed within the holder. One of those contacts is disposed adjacent the innermost end of the cavity within the holder provided by the present invention; and that contact is of dish-shaped configuration, having a relatively flat center portion and an upstanding rim. The upstanding rim will engage the end face of the terminal of the cartridge enclosed electric fuse, while the relatively flat center portion will normally be spaced a short distance away from the end face of the fuse terminal. Such an arrangement enables the contact to attain intimate electrical engagement with the terminal of the cartridge enclosed electric fuse even though the fusible link of that fuse is secured to that terminal by an irregularly shaped mass of solder on the exterior of the end face of that terminal; the space between the center portion of the contact and the end face of that terminal accommodating the mass of solder and thus permitting the upstanding rim to engage the end face of the terminal. The upstanding rim will thus provide line contact rather than point contact between the innermost contact of the holder and the one terminal of the fuse; such line contact guaranteeing a good electrical connection between the fuse and that contact, even though the mechanic may have gotten some dirt or grease on the terminal of the fuse while inserting the fuse in the holder. It is therefore an object of the present invention to provide a holder for cartridge enclosed electric fuses with a contact that has a relatively flat center portion and an upstanding rim.

The leads or wires connected to the contacts of the fuse holder of the present invention are encased within the insulation, which forms part of that fuse holder, for considerable distances. With such an arrangement, any deterioration in the value of the insulation on the leads or wires, due to soldering or any excessive stripping of the leads or wires preparatory to soldering, is not objectionable since any insufficiently insulated or bare portions of the wires or leads will be wholly confined within the insulation of the holder. It is therefore an object of the present invention to provide a fuse holder, largely made of insulating material, that receives the insulation on the leads or wires extending to the contacts disposed within the fuse holder.

In prior cartridge enclosed fuse holders the various parts of the fuse holder had to be assembled very carefully and maintained in assembled relation during manufacture. With the present invention, the elements that are positioned in the holder and that serve to support the wires or leads are individually insertable into the holder after the holder has been formed.

Where cartridge enclosed fuse holders are secured to an instrument panel or other portion of a land, air or sea vehicle, it is oftentimes difficult to reach into the necessarily crowded areas behind the instrument panel and solder or otherwise secure the leads or wires to the terminals or contacts of the fuse holders. This problem is obviated by the present invention by providing long leads as part of the fuse holder. The projecting ends of these leads extend outwardly from the fuse holder of the present invention and can be moved a considerable distance away from the instrument panel for connection to wires extending from the apparatus to be protected by the fuse. In such instances, there is no crowding in and around the areas where the electrical connections are to be made; and thus the present invention simplifies the securement of the leads of the fuse holder to the wires extending from the apparatus to be protected. It is therefore an object of the present invention to provide a fuse holder with relatively long leads for connection to the apparatus to be protected.

Where fuse holders are secured to an instrument panel, the crowded conditions adjacent that panel make it difficult for the leads or wires to be extended toward the holders without first making sharp bends in the leads or wires; yet such bends in the leads or wires is often required with prior fuse holders. The present invention obviates all need of sharp bends in the leads or wires adjacent the fuse holder by providing a fuse holder wherein the leads or wires extend into the fuse holder in a direction parallel to the axis of the fuse holder. It is therefore an object of the present invention to provide a fuse holder wherein the leads or wires extend into the fuse holder in a direction parallel to the axis of the fuse holder.

The fuse holder of the present invention has a stationary contact that can be made by punching it from a flat sheet of metal. Such an element has a central opening to receive the fuse and the movable contact carried by the detachable closure of the fuse holder, it has anchoring projections which extend into recesses in the fuse holder to secure it in assembled relation with the fuse holder, and it has projections which normally limit the rotation of the movable contact carried by the detachable closure of the fuse holder. Such a contact can be made in one operation; and thus it facilitates simple and inexpensive manufacture of the fuse holder of the present invention. In addition, that contact has an opening through which the lead or wire to be connected to that contact may be passed; and such opening facilitates the assembling and soldering of the lead or wire to that contact. It is therefore an object of the present invention to provide a stationary contact which can be punched from a flat sheet of metal, which has an opening to receive the lead or wire, which has anchoring projections to extend into recesses in the fuse holder to maintain it in position, and has projections to limit rotation of the movable contact carried by the detachable closure of the fuse holder.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

Figure 2:
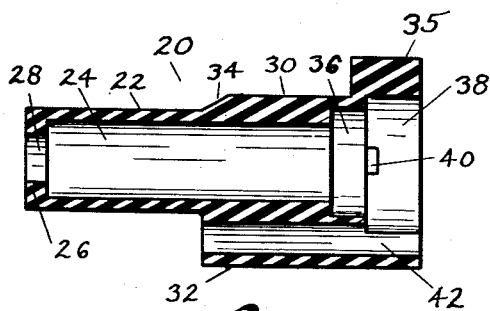
Figure 3:
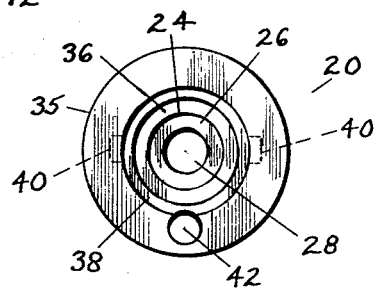
Figure 4:
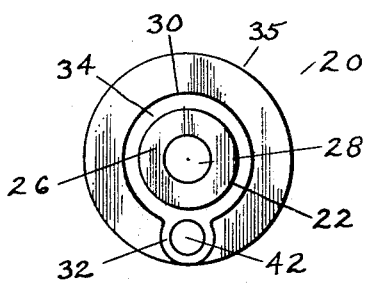
Figure 5:
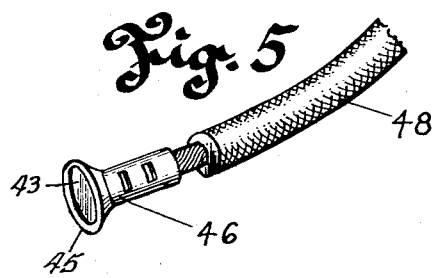
Figure 6:
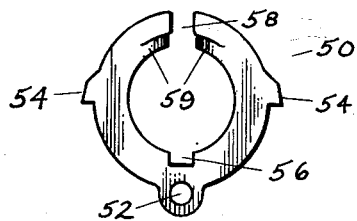
Figure 7:
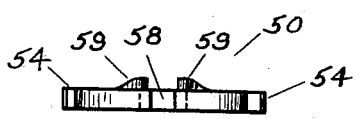

In the drawing,

Fig. 1 is a cross sectional, side view of a holder for cartridge enclosed protectors for electric circuits, and it shows that holder assembled on a panel with a protector for electric circuits confined therein, Fig. 2 is a cross sectional, side view of the housing of the holder of Fig. 1, Fig. 3 is an end view of the housing shown in Fig. 2, and it shows the larger end of that housing, Fig. 4 is an end view of the housing shown in Fig. 2, and it shows the smaller end of that housing, Fig. 5 is a perspective view of one contact of the holder shown in Fig. 1, Fig. 6 is an end view of the stationary contact used with the holder of Fig. 1, Fig. 7 is a plan view of the contact of Fig. 6.

Figure 8:
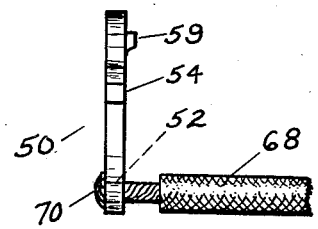
Figure 9:
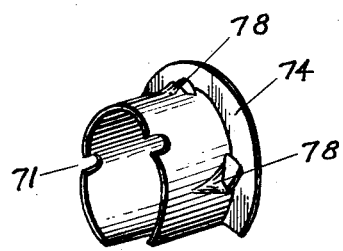
Figure 10:
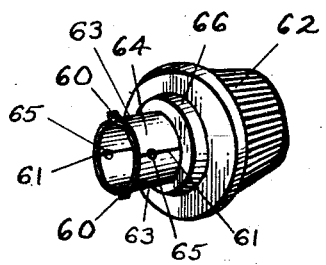
Figure 11:
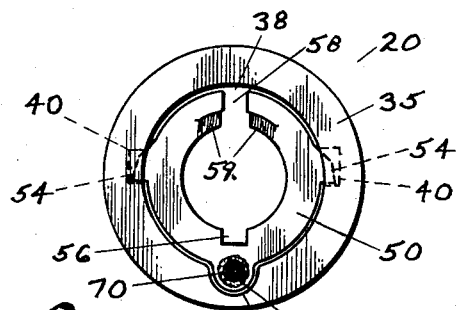

Fig. 8 is a side view of the contact of Fig. 6, and it shows that contact assembled with a lead or wire, Fig. 9 is a perspective view of a bent sleeve used to hold the holder of Fig. 1 in assembled relation with an instrument panel, Fig. 10 is a somewhat reduced, perspective view of the detachable closure of the holder shown in Fig. 1, and Fig. 11 is an end view of the housing of Figs. 2–4, and it shows the contact of Figs. 6–8 assembled with that housing.

Referring to the drawing in detail, the numeral 20 generally denotes a body or housing that is a part of a holder for cartridge enclosed protectors for electric circuits made in accordance with the principles and teachings of the present invention. As disclosed in the drawing, the housing 20 is a unitary piece of insulating material; and that housing can be cast, molded, or otherwise formed as desired. Casting or molding of the housing 20 is highly desirable because it permits inexpensive but accurate formation of the housing 20. The housing 20 has a cylindrical body portion 22 projecting from the rear thereof, and that portion has a bore 24 of uniform diameter therein. The left hand end of the cylindrical body portion 22 is closed by a wall 26, and that wall has an opening 28 therethrough. The opening 28 is concentric with the bore 24 in the cylindrical body portion 22. The bore 24 extends into the large diameter cylindrical body portion 30 of the housing 20, which portion is concentric with and contiguous to the cylindrical body portion 22. A cylindrical body portion 32 is formed as a part of the housing 20; and that portion is eccentric to the body portions 22 and 30. A tapered section 34 is made integral with the cylindrical body portions 22 and 30; and that tapered section extends between the body portions 22 and 30, and it also merges with the left hand end of body portion 32. A flange 35 is provided for the large end of the housing 20, and that flange projects radially outwardly from the cylindrical body portion 30. The flange 35 is concentric with body portions 22 and 30, and it merges with the eccentric cylindrical portion 32 of the housing 20.

A recess 36 is provided in the cylindrical body portion 30; and that recess is concentric with and contiguous with the bore 24, but it has a larger diameter than that bore. A second recess 38 is provided in the flange 35, and that recess is concentric with and contiguous with the bore 24 and recess 36, and it has a larger diameter than that bore and that recess. The bore 24 and the recesses 36 and 38 form a cavity within the housing 20 to receive a cartridge enclosed electric fuse. A pair of oppositely disposed recesses 40 are formed in the side walls of the recess 38, and the recesses 40 extend into the flange 35.

The offset body portion 32 has a uniform diameter bore 42 therein, and that bore extends into the flange 35 and merges with the recess 38. Consequently, the right hand end of the bore 42 merges with and opens into the cavity that receives the cartridge enclosed electric fuse. The bores 24 and 42, and the recesses 36, 38 and 40 can all be made in the same operation in which the housing 20 is itself made; and such an arrangement minimizes the cost of making housing 20. It will be noted that, as molded, the housing 20 can be entirely free of embedded metal components. This not only obviates the cost of the metal, but also simplifies the manufacture of housing 20.

A helical spring 44 is positioned within the bore 24, and that spring is dimensioned so it can be compressed without binding or jamming in the bore 24. The inner diameter of the spring 44 is large enough so the spring can surround the rearwardly extending sleeve on the inner contact 46 of the holder. That sleeve receives the stripped end of a lead or wire 48; and the end of lead 48 can be permanently secured to the contact 46, as by crimping the end of the sleeve onto the end of that lead, by soldering that end of the lead into the sleeve, or by any other suitable method. The opening 28 in the wall 26 of the housing 20 is preferably dimensioned so the insulation of the lead 48 substantially fills that opening, thus tending to prevent the introduction of a wire or piece of metal into the opening 28. However, the diameter of lead 48 must be small enough, relative to the opening 28, to permit movement of lead 48 relative to that opening.

The contact 46 has a dish-shaped configuration; having a relatively flat center portion 43 and also having an upstanding rim 45. The rim 45 extends a slight distance ahead of the center portion 43 of contact 46, and it will bear against the end face of the terminal of a fuse disposed within the holder, even though an irregularly shaped mass of solder is on that end face. In the absence of this dish-shaped configuration of contact 46, an irregularly shaped mass of solder on the end face of the terminal of the fuse might limit the engagement between the contact and the fuse terminal to mere point contact. With the dish-shaped configuration of contact 46, however, the space between the center portion of the contact and the end face of the fuse terminal will accommodate any solder mass on the terminal and permit the rim to seat firmly against that terminal. This provides line contact between the terminal of the fuse and the contact 46; and this line contact will assure a good electrical connection even through the mechanic in inserting the fuse happened to get dirt or grease onto its terminals. The contact 46 has a diameter that is no greater than, and is preferably smaller than, the terminal of the fuse, whereby the contact engages the end face of the fuse terminal and does not act as a cup to grip and hold the fuse. The contact 46 will reciprocate within the bore 24, but it is confined against radial movement; thus the contact 46 is of the semi-fixed type.

The numeral 50 generally denotes a stationary contact which is positioned within the housing 20. That contact has an opening 52 at one side thereof to receive a lead or wire 68, it has anchoring projections 54 extending outwardly from the sides thereof, it has a notch 56 to receive a projection 60 on the movable contact 64 carried by detachable closure 62 of the holder, it has a gap 58 between the free ends of the sides thereof to receive the other projection 60 on the movable contact 64, and it has depending projections 59 which normally limit rotation of projections 60.

The contact 64 may be punched out of a flat sheet of metal; and in that case it will have axially extending slits 61. However, contact 64 can be made by other methods. Outwardly extending projections 60 are formed on the outer end of contact 64; and axially extending ridges 63 are formed on the sides of that contact to assist in securing that contact within closure 62 and to make that contact acircular. The cavity in contact 64 is large enough to receive a fuse terminal readily; but bent portions 65, spaced from the inner end of the cavity a distance greater than the length of that terminal, are spaced apart a distance slightly smaller than the diameter of that terminal. These bent portions normally do not engage the fuse terminal, but instead lie behind the terminal and resist accidental separation of fuse and contact. A shoulder 66 on closure 62 has a diameter smaller than that of recess 38. Shoulder 66 projects into recess 38 when the closure 62 is assembled with housing 20, and it cooperates with the walls of recess 38 to obviate a straight-line path from the exterior to the interior of the holder.

The stationary contact 50 can be made by punching it from a flat sheet of metal; it is initially provided with a circular central opening and it preferably is made with an outer diameter slightly less than the diameter of recess 38. It is then bent until the gap 58 is closed, it is inserted in the recess 38 so the anchoring projections 54 register with recesses 40 in housing 20, and then the sides of the contact are spread apart to force projections 54 into recesses 40. However, the central opening is not rendered circular again; instead, the midpoints of the sides of contact 50 are spaced apart a distance smaller than the original diameter of the central opening. This distance is smaller than the distance between ridges 63 on contact 64 although the diameter of the original central opening in the contact 50 was greater than the distance between ridges 63.

If desired, contact 50 could be made of springy metal, momentarily bent until the distance between the outer edges of projections 54 was less than the diameter of recess 38, slipped into recess 38, and then released so the projections 54 would enter recesses 40; and also if desired, the contact 50 could be made with a slit rather than the gap 58, whereby the distance between the anchoring projections 54 is initially less than the diameter of recess 38. In the latter two arrangements, the step of closing gap 58 can be eliminated; and where the contact is made with a slit rather than gap 58, the contact need only be inserted in recess 38 and expanded. Once placed in the position shown in Fig. 11, the contact 50 will remain in that position and be locked in assembled relation with housing 20. In that position the semicircular portion of contact 50, which is adjacent opening 52, will extend into the bore 42 where that bore merges with recess 38.

Prior to the time the contact 50 is introduced into and locked in the recess 38, the end of a lead 68 will be passed through opening 52 in contact 50; and that end will be secured to contact 50, as by solder 70. Thereafter the free end of lead 68 will be threaded through bore 42, and contact 50 will be seated and locked in recess 38. Solder 70 will make a good electrical connection between lead 68 and contact 50, and it will also enable contact 50 to support lead 68. Contact 50 will serve to releasably connect lead 68 with movable contact 64 on closure 62.

When the housing 20 has been equipped with innermost contact 46, helical spring 44, lead 48, stationary contact 50, and lead 68, it is ready for insertion in an instrument panel 72. This panel may be a part of a land, sea or air vehicle or it may be part of a stationary structure. To facilitate the securement of the housing 20 to the instrument panel 72, either a keyhole-shaped opening or a circular opening should be made in that panel. The keyhole-shaped opening is desirable because it cooperates with the shape of housing 20 to resist rotation of the holder. The keyhole-shaped opening should have a large diameter section to accommodate body portion 30 and should have a small diameter section to accommodate the eccentric body portion 32; and the circular opening should have a diameter slightly larger than the distance between the top of body portion 30 and the bottom of body portion 32. The housing 20 will be held in assembled relation with the panel 72 by a split sleeve 74 which is positioned between the outer periphery of the body portion 30 and the inner periphery of the opening. The sleeve 74 is preferably made of resilient metal, as for example spring steel; and it has notches 74 and projections 76. The portions of the sleeve 74 adjacent the notches 74 are bent inwardly, and the projections 76 are bent outwardly; and as a result the sleeve 74 can simultaneously bite into the materials of which the body portion 30 and the instrument panel 72 are made, or can bite into the body portion 30 and can project beyond the far side of the panel and prevent the removal of the sleeve and housing. With this arrangement, simple and quick installation of the holder is possible; and the holder will be held against accidental dislodgment. It will be noted that the sleeve 74 is not a complete cylinder, but instead is only about seven eighths of a cylinder. This enables the sleeve to be used without extending completely under the eccentric body portion 32. Thus the sleeve 74 can be used to confine the circular right hand portion of the housing 20. Once the housing 20 and sleeve 74 have been placed in position, they will resist all ordinary attempts to remove them.

In use, the housing 20, together with innermost contact 46, stationary contact 50, spring 44, and leads 48 and 68, is permanently mounted in the opening in the instrument panel 72. Thereafter a fuse 80 is inserted in the cavity of contact 64; closure 62 and the fuse carried thereby are moved adjacent the housing 20, the projections 60 of contact 64 are aligned with the gap 58 and the notch 56 of contact 50, and the closure 62 is moved toward the recess 36 until the shoulder 66 enters the recess 38 and until the projections 60 pass through the gap 58 and notch 56 of contact 50. To do this, only a slight pressure on closure 62 is needed to compress the helical spring 44. Once the projections 60 have passed through the gap 58 and the notch 56, the closure 62 can be rotated about ninety degrees and then released. Thereupon the compressed spring 44 will expand; forcing the rim of dish-shaped contact 46 into intimate engagement with one terminal of fuse 80, forcing the other terminal of fuse 80 into intimate engagement with contact 64, and forcing projections 60 of contact 64 into intimate engagement with the stationary contact 50. Thus the spring 44 directly assists in maintaining intimate electrical engagement between fuse 80 and the contacts 46 and 64, and in maintaining intimate electrical engagement between contacts 50 and 64.

When the closure 62 is rotated, the ridges 63 are moved into engagement with the midpoints of the sides of contact 50, thus spreading those sides apart still further. Those sides will tend to return to position and will thus provide a sizeable contact pressure against ridges 63; thus providing intimate and completely adequate engagement between contacts 64 and 50. Such electrical engagement obviates the uncertain engagement, high contact resistance, and heating experienced in former fuse holders.

In turning the closure 62, but little care need be used by the operator because movement of the projections 60 will normally be limited by the projections 59 on contact 50, thus preventing accidental separation of closure 62 and housing 20. Intentional separation of closure 62 and housing 20 is easily effected by pressing the closure 62 toward the housing 20 while rotating the projections 60 into register with the gap 58 and the notch 56 of contact 50. Thereafter, mere release of the pressure on the closure 62 will enable the helical spring 44 to move the closure 62 out of engagement with the contact 50. At such time, the closure 62 can be removed to facilitate inspection or replacement of the fuse 80.

All openings in the housing 20 are substantially closed or baffled when the holder is assembled. This is very desirable because it obviates the existence of any straight line path from the exterior to the interior of the holder, thus avoiding any accidental contact with wires, leads, or pieces of metal, and also excluding dirt, dust and foreign matter. It should also be noted that the leads 48 and 68 are insulated, and that the insulation on those leads extends sufficiently far into the fuse holder so the ends of the leads 48 and 68 are encased both by their own insulation and by the insulation forming the bores 24 and 42. This provides an unusually safe construction.

The leads 48 and 68 project coaxially from the rear of the housing 20, and they are parallel to the axis of the housing 20 but of course they can easily be bent in any desired manner outside of the housing 20. These leads may extend away from the crowded and congested conditions immediately behind the instrument panel 72, and, since the leads will preferably be six or more inches in length, they can be connected to wires extending from the apparatus to be protected at a distance from the instrument panel. In this way, installation is made simple and safe; and there is but little danger of accidental contact with other leads during installation. In addition, there is no "live" part exposed on the surface of the fuse holder when it is assembled; everything exposed being of insulating material. As a result, an extremely safe construction is provided.

Whereas a preferred embodiment of the present invention has been shown and described, it should be obvious to those skilled in the art that various changes may be made in the form of the invention without affecting the scope thereof.

What I claim is:

1. A holder for cartridge enclosed protectors for electric circuits that comprises a two-part elongated body that is of insulation material throughout the length thereof, one of said parts having a portion formed as an imperforate continuous wall to define a central bore and having a second portion formed as a wall to define a second bore of reduced cross-section, said bores being coaxial and contiguous and defining a continuous bore adapted to receive a cartridge enclosed protector for electric circuits, said second portion having a cross-section smaller than the cross section of the first said portion whereby said first portion extends radially outwardly beyond said second portion to define a shoulder, said second portion being insertable through an opening in a panel and said shoulder being registerable with the portions of said panel that define said opening in said panel, said second portion having a wall at the end thereof which is spaced from the first said portion, said end wall having an opening therethrough of smaller cross section than the cross-section of said second bore, a contact in said continuous bore adjacent said end wall in register with said opening in said end wall to receive one end of said cartridge enclosed protector for electric circuits, a second contact disposed within said continuous bore intermediate the ends thereof and spaced from the first said contact, said second contact having arms that extend circumferentially of said continuous bore and terminate short of each other to define a gap, a notch in said second contact, a recess in said first part that is contiguous with said continuous bore, a portion of said second contact extending into said recess and being electrically connected to a conductor that extends co-axially with said continuous bore, the other of said parts carrying a third contact, said third contact receiving the other end of said cartridge enclosed protector for electric circuits and having circumferentially spaced projections thereon that selectively extend inwardly of and underlie and engage said arms and thereby limit movement of said third contact outwardly of said continuous bore and electrically connect said second and third contacts, one of said projections on said third contact being registerable with and passing through said gap and another of said projections on said third contact being registerable with and passing through said notch.

2. A holder for cartridge enclosed protectors for electric circuits as claimed in claim 1 wherein said third contact is a hollow cylinder wherein axially extending slits are formed in the wall of said cylinder, wherein axially extending ridges are formed in the wall of said cylinder and are in alignment with said projections and project radially outwardly and wherein said arms are locally distortable by said ridges to permit rotation of said third contact relative to said second contact and to establish an electrical connection of low resistance between said second and said third contacts.

3. A holder for cartridge enclosed protectors for electric circuits that comprises a two-part elongated body that is of insulation material throughout the length thereof, one of said parts having a portion formed as an imperforate continuous wall to define a central bore and having a second portion formed as a wall to define a second bore of reduced cross-section, said bores being coaxial and contiguous and defining a continuous bore adapted to receive a cartridge enclosed protector for electric circuits, said second portion having a cross-section smaller than the cross-section of the first said portion whereby said first portion extends radially outwardly beyond said second portion to define a shoulder, said second portion being insertable through an opening in a panel and said shoulder being registerable with the portions of said panel that define said opening in said panel, said second portion having a wall at the end thereof which is spaced from the first said portion, said end wall having an opening therethrough of smaller cross-section than the cross-section of said second bore, a contact in said continuous bore adjacent said end wall in register with said opening in said end wall to receive one end of said cartridge enclosed protector for electric circuits, a second contact disposed within said continuous bore intermediate the ends of said continuous bore, a notch in said second contact and a portion of the periphery of said second contact that is in register with said notch and that projects radially outwardly away from said notch, said second contact having arms that extend circumferentially of said continuous bore and away from said notch and away from said projecting portion of the periphery of said second contact, said arms terminating short of each other to define a gap, a recess in said body that is contiguous with said continuous bore to receive and confine said outwardly projecting portion of the periphery of said second contact and thereby to resist rotation of said second contact, a third contact in the form of a hollow cylinder which is carried by the other part of the holder and which has a projection thereon which extends radially outwardly beyond the surface of said hollow cylinder, said third contact being adapted to encircle the other end of said cartridge enclosed protector for electric circuits and to hold said protector so the said one end thereof can be introduced into said continuous bore and moved between said arms of said second contact and into engagement with the first said contact, said projection on said third contact being registerable with and passing through said gap, said third contact being rotatable relative to said second contact to place said projection in register with said arms of said second contact and thereby prevent accidental separation of said second and said third contacts, said third contact conducting current from said second contact to said other end of said protector.

4. A holder for cartridge enclosed protectors for electric circuits that comprises a two-part elongated body that is of insulation material throughout the length thereof, one of said parts having a portion formed as an imperforate continuous wall to define a central bore and having a second portion formed as a wall to define a second bore of reduced cross-section, said bores being coaxial and contiguous and defining a continuous bore adapted to receive a cartridge enclosed protector for electric circuits, said second portion having a cross-section smaller than the cross section of the first said portion whereby said first portion extends radially outwardly beyond said second portion to define a shoulder, said second portion being insertable through an opening in a panel and said shoulder being registerable with the portions of said panel that define said opening in said panel, said second portion having a wall at the end thereof which is spaced from the first said portion, said end wall having an opening therethrough of smaller cross-section than the cross-section of said second bore, a contact in said continuous bore adjacent said end wall in register with said opening in said end wall to receive one end of said cartridge enclosed protector for electric circuits, a second contact disposed within said continuous bore intermediate the ends of said continuous bore, a notch in said second contact, said second contact having arms that extend circumferentially of said continuous bore and away from said notch and terminate short of each other to define a gap, a recess in said body that is contiguous with said continuous bore, a portion of said second contact extending into said recess and being electrically connected to a conductor, a third contact in the form of a hollow cylinder which is carried by the other part of said holder and which has circumferentially spaced projections thereon that extend radially outwardly beyond the surface of said hollow cylinder, said third contact being adapted to encircle the other end of said cartridge enclosed protector for electric circuits and to hold said protector so the said one end thereof can be introduced into said continuous bore and moved between said arms of said second contact and into engagement with the first said contact, one of said projections being registerable with and passing through said gap, another of said projections being registerable with and passing through said notch, said third contact being rotatable relative to said second contact to place said projections in register with said arms of said second contact and thereby prevent accidental separation of said second and said third contacts, said third contact conducting current from said second contact to said other end of said protector.

MANFRED F. DUERKOB.

References Cited in the file of this patent

UNITED STATES PATENTS

| Number | Name | Date |
| --- | --- | --- |
| 527,071 | Packard | Oct. 9, 1894 |
| 954,537 | McDonald | Apr. 12, 1910 |
| 1,275,391 | Cole | Aug. 13, 1918 |
| 1,483,218 | Fahnestock | Feb. 12, 1924 |
| 1,494,293 | Sclater | May 13, 1924 |
| 1,654,475 | Wyman | Dec. 27, 1927 |
| 1,840,016 | Boll et al. | Jan. 5, 1932 |
| 1,965,437 | Stachle | July 3, 1934 |
| 2,053,916 | Merkle | Sept. 8, 1936 |
| 2,144,139 | Batcheller | Jan. 17, 1939 |
| 2,158,004 | Douglas | May 9, 1939 |
| 2,187,427 | Middleton | Jan. 16, 1940 |
| 2,207,837 | Sundt | July 16, 1940 |
| 2,281,186 | Wade | Apr. 28, 1942 |
| 2,581,303 | Smith | Jan. 1, 1952 |

FOREIGN PATENTS

| Number | Country | Date |
| --- | --- | --- |
| 710,003 | France | May 26, 1931 |